United States Patent
Anspaugh et al.

[11] Patent Number: 5,941,129
[45] Date of Patent: Aug. 24, 1999

[54] CLAMP FOR MOTOR VEHICLE STEERING COLUMN

[75] Inventors: Michael Patrick Anspaugh, Bay City; Randy Thomas Christensen, Linwood; Michael James Housel, Bay City; Amy Elizabeth Foss Miller, Saginaw, all of Mich.

[73] Assignee: General Motors Corporation, Detroit, Mich.

[21] Appl. No.: 08/897,408

[22] Filed: Jul. 21, 1997

[51] Int. Cl.⁶ .............................. B62D 1/18; B62D 1/20
[52] U.S. Cl. ................................ 74/493; 74/499
[58] Field of Search ............... 74/493, 491, 37, 74/431, 433, 410.14, 502.2; 376/353; 411/411, 114, 424

[56] References Cited

U.S. PATENT DOCUMENTS

| | | | |
|---|---|---|---|
| 1,974,150 | 9/1934 | Creveling | 411/411 |
| 4,244,237 | 1/1981 | Sprunger | 74/493 |
| 4,363,499 | 12/1982 | Watanabe et al. | 280/775 |
| 4,472,982 | 9/1984 | Nishikawa | 74/493 |
| 4,541,298 | 9/1985 | Strutt | 74/493 |
| 4,732,050 | 3/1988 | Vollmer | 74/493 |
| 4,774,851 | 10/1988 | Iwanami et al. | 74/493 |
| 4,788,880 | 12/1988 | Kester | 74/493 |
| 4,957,401 | 9/1990 | Hatter | 411/411 |
| 5,117,707 | 6/1992 | Kinoshita et al. | 74/493 |
| 5,160,165 | 11/1992 | Hoblingre | 280/775 |
| 5,199,319 | 4/1993 | Fujiu | 74/493 |
| 5,287,763 | 2/1994 | Nagashima | 74/493 |
| 5,338,064 | 8/1994 | Sadakata et al. | 74/493 |
| 5,366,331 | 11/1994 | Erbes | 411/411 |
| 5,423,572 | 6/1995 | Stuedemann et al. | 280/775 |
| 5,481,938 | 1/1996 | Stuedemann et al. | 74/493 |
| 5,555,772 | 9/1996 | Schneider | 74/493 |
| 5,700,032 | 12/1997 | Fukanaga | 74/493 |
| 5,788,277 | 8/1998 | Hibino et al. | 74/493 |

*Primary Examiner*—Charles A. Marmor
*Assistant Examiner*—Roger Pang
*Attorney, Agent, or Firm*—Robert M. Sigler

[57] ABSTRACT

A clamp for capturing an adjusted position of a motor vehicle steering column including a stationary bracket having planar sides on opposite sides of the steering column, vertical slots in the planar sides of the stationary bracket, and a rotatably immobilized bolt spanning the planar sides of the stationary bracket through the vertical slots. A primary nut includes a frustoconical shoulder and a tubular boss. The primary nut is screwed onto the bolt on one side of the stationary bracket and cooperates with a head of the bolt on the other side of the stationary bracket in squeezing together the planar sides of the stationary bracket. A plastic operating lever of the clamp has a lateral bore around the tubular boss on the primary nut and a frustoconical cavity which faces the frustoconical shoulder on the primary nut. A secondary nut screwed onto the tubular boss on the primary nut thrusts the frustoconical shoulder into the frustoconical cavity to couple together the plastic operating lever and the primary nut for unitary rotation. The secondary nut seats against an annular land at the base of the tubular boss to limit the thrust of the frustoconical shoulder into the frustoconical cavity.

4 Claims, 3 Drawing Sheets

CLAMP FOR MOTOR VEHICLE STEERING COLUMN

TECHNICAL FIELD

This invention relates to a clamp for capturing an adjusted position of a motor vehicle steering column.

BACKGROUND OF THE INVENTION

Motor vehicle steering columns are commonly mounted on a body of the vehicle for up and down pivotal movement to adjust the vertical position of a steering wheel on the steering column. A typical clamp for capturing an adjusted position of the steering column includes a bracket on the body having planar sides on opposite sides of the steering column, vertical slots in the planar sides of the bracket, and a bolt traversing the bracket through the vertical slots. With either the nut or the bolt rotatably immobilized relative to the bracket, rotation of the other, i.e., the "rotatable element", in opposite directions frictionally clamps the planar sides of the bracket against and releases the planar sides of the bracket from the steering column. For manual operation, a steel operating lever is coupled to the rotatable element of the clamp for unitary rotation with the rotatable element. A predetermined locked position of the steel operating lever is established by pressing an aperture in the steel lever over a serrated cylindrical boss on the rotatable element after the rotatable element is rotated to a position in which the steering column is frictionally clamped between the planar sides of the bracket. In such constructions, a retainer fastened to the rotatable element over the lever positively prevents dislodgment of the lever from the rotatable element. In another known construction, the rotatable element has a frustoconical shoulder thereon which is thrust into a frustoconical cavity in the steel lever to frictionally couple the steel lever to the rotatable element.

SUMMARY OF THE INVENTION

This invention is a new and improved clamp for capturing an adjusted position of a motor vehicle steering column including a stationary bracket on a body of the motor vehicle having a pair of planar sides on opposite sides of the steering column, a pair of slots in the planar sides of the stationary bracket, and a bolt spanning the planar sides of the stationary bracket through the slots and rotatably immobilized relative to the stationary bracket. A primary nut of the clamp includes a frustoconical shoulder having radial serrations thereon and a tubular boss. The primary nut is screwed onto the bolt on one side of the stationary bracket and cooperates with a head of the bolt on the other side of the stationary bracket in squeezing together the planar sides of the stationary bracket when the primary nut is rotated in a tightening direction. A plastic operating lever of the clamp has a lateral bore around the tubular boss on the primary nut and a frustoconical cavity which faces the frustoconical shoulder on the primary nut. A secondary nut screwed onto the tubular boss on the primary nut thrusts the frustoconical shoulder into the frustoconical cavity to couple together the plastic operating lever and the primary nut for unitary rotation. The secondary nut seats against an annular land on the primary nut at the base of the tubular boss to limit the thrust of the frustoconical shoulder into the frustoconical cavity. The radial serrations in the frustoconical shoulder of the primary nut indent corresponding radial serrations in the frustoconical cavity to enhance the couple between the plastic operating lever and the primary nut.

DESCRIPTION OF THE PREFERRED EMBODIMENT

Figure 1:
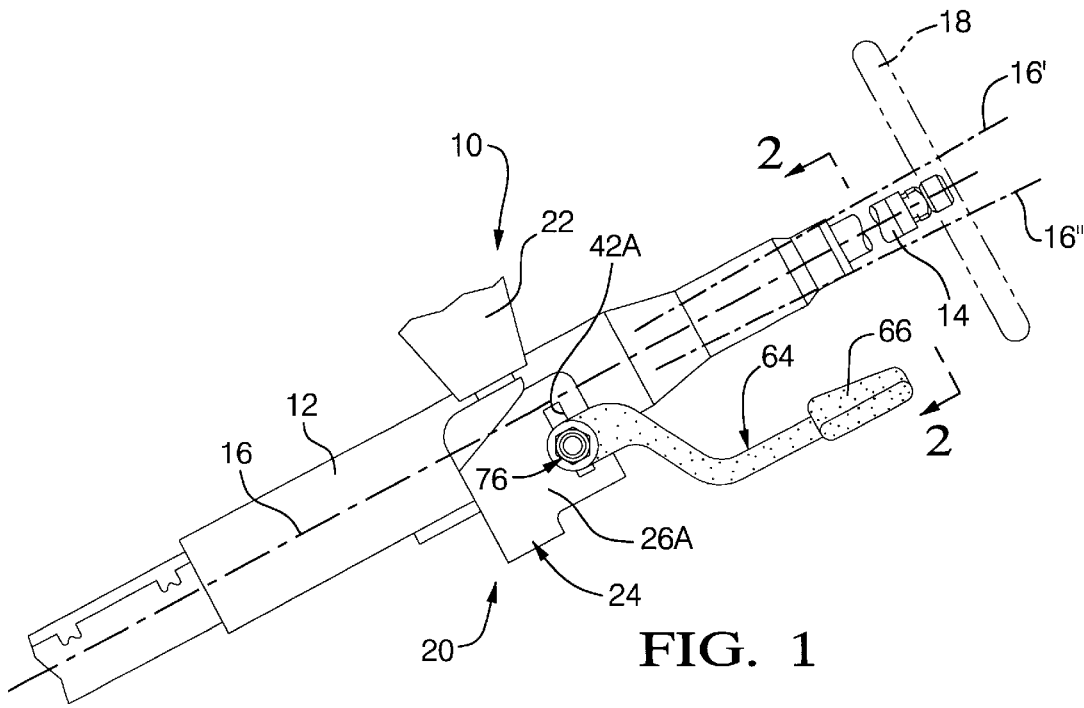
FIG. 1 is a fragmentary elevational view of a motor vehicle steering column and a clamp according to this invention for capturing an adjusted position of the steering column.
Figure 2:
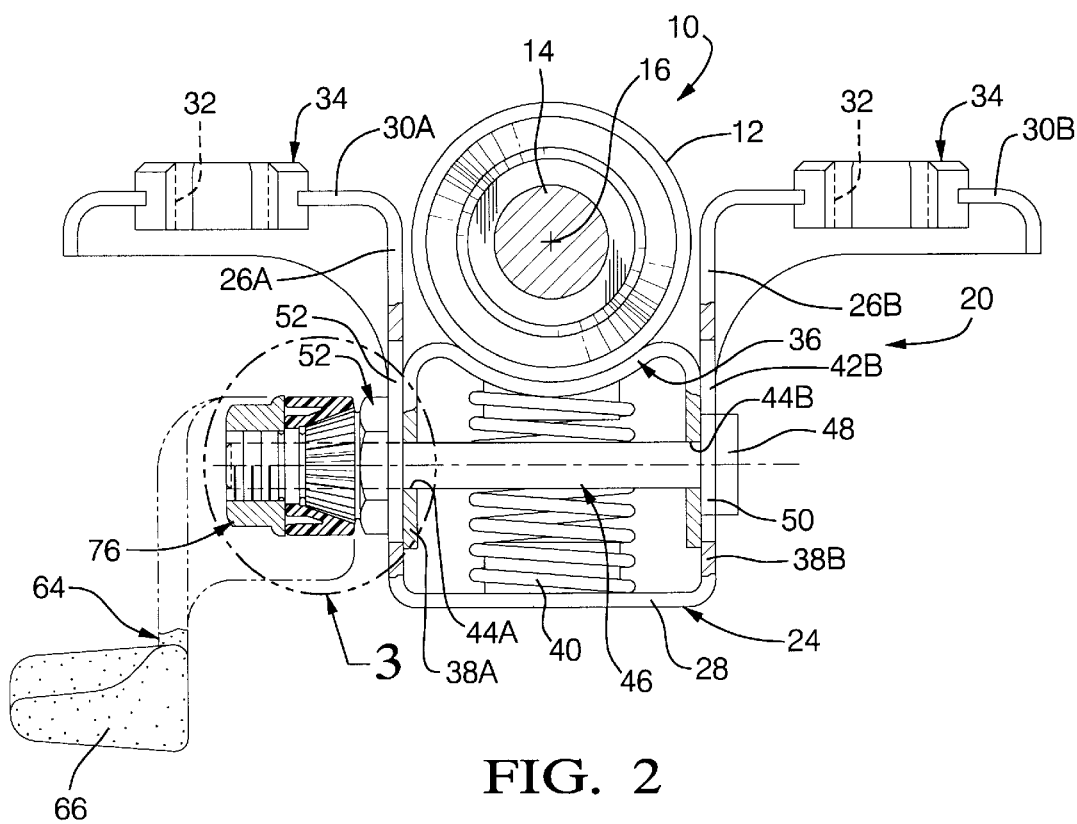
FIG. 2 is an enlarged sectional view taken generally along the plane indicated by lines 2—2 in FIG. 1.

Referring to FIG. 1, a motor vehicle steering column 10 includes a tubular mast jacket 12 and a steering shaft 14 supported on the mast jacket for rotation about a longitudinal centerline 16 of the steering column. A steering wheel 18 is rigidly attached to an upper end of the steering shaft 14. The mast jacket 12 is mounted on a body structure, not shown, of the motor vehicle for up and down pivotal movement to adjust the vertical position of the steering wheel 18 between upper and lower limit positions identified by positions 16', 16" of the centerline 16. A clamp 20 according to this invention for capturing the vertical position of steering column 10 is disposed between the mast jacket 12 and a structurally rigid element 22 of the body of the motor vehicle.

Referring to FIGS. 2–5, the clamp 20 includes a U-shaped stationary steel bracket 24 having a pair of vertical planar sides 26A, 26B on opposite sides of the steering column, a lateral web 28 between the vertical sides, and a pair of horizontal wings 30A, 30B. Respective ones of a pair of hanger bolts, not shown, on the rigid element 22 of the vehicle body project through a passage 32 in each of a pair of capsules 34 on respective ones of the wings 30A, 30B. Nuts, not shown, on the hanger bolts below the capsules 34 clamp the capsules and the stationary bracket 24 to the structural element 22.

A spacer 36 welded to the mast jacket 12 of the steering column includes a pair of planar sides 38A, 38B juxtaposed respective ones of the planar sides 26A, 26B of the stationary bracket 24. The planar sides 38A, 38B of the spacer may be reinforced against flexure toward each other. A spring 40 seated on the web 28 of the stationary bracket 24 biases the steering column toward the up-limit position 16'.

The planar sides 26A, 26B of the stationary bracket 24 are perforated by a pair of generally vertical slots 42A, 42B. A pair of apertures 44A, 44B in the planar sides 38A, 38B of the spacer 36 register with the slots 42A, 42B, respectively. A bolt 46 of the clamp 20 spans the spacer 36 and the stationary bracket 24 through the vertical slots 42A, 42B and through the apertures 44A, 44B so that the bolt moves up and down in the slots 42A, 42B as a unit with the steering column. A head 48 of the bolt 46 is disposed outboard of the planar side 26B of the stationary bracket 24. A rectangular boss 50 on the bolt head 48 slides up and down in the vertical slot 42B and cooperates with the edges of the slot in rotatably immobilizing the bolt 46 relative to the stationary bracket 24.

Figure 3A:
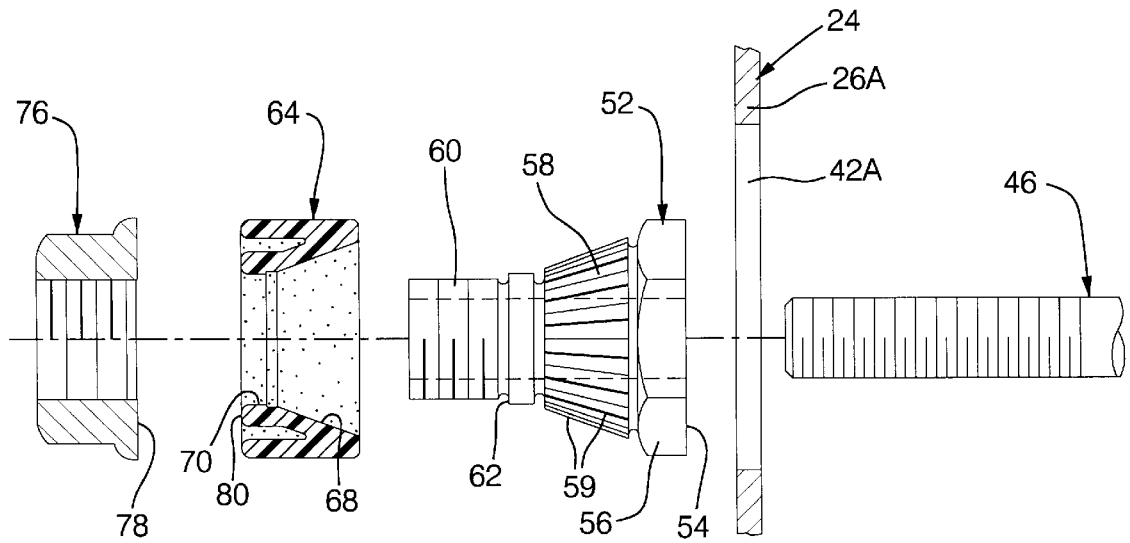
FIGS. 3A and 3B are enlarged normal and exploded views, respectively, of the portion of FIG. 2 identified by the reference circle 3 in FIG. 2.
Figure 3B:
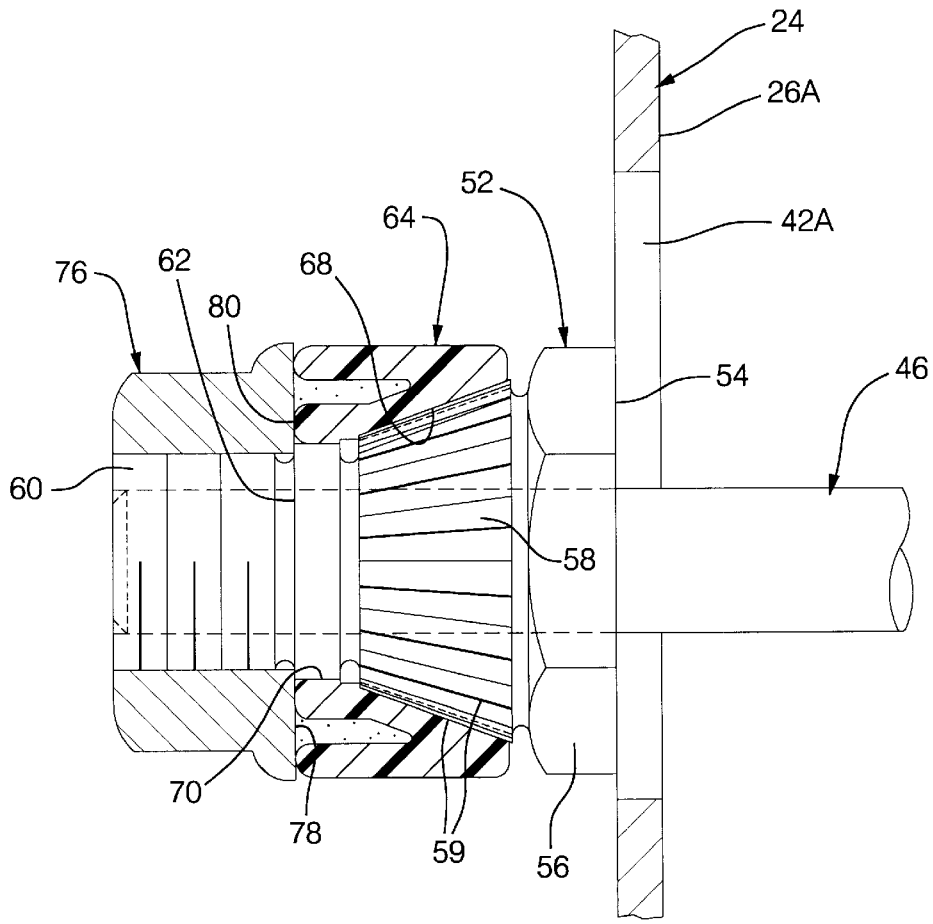
Figure 4:
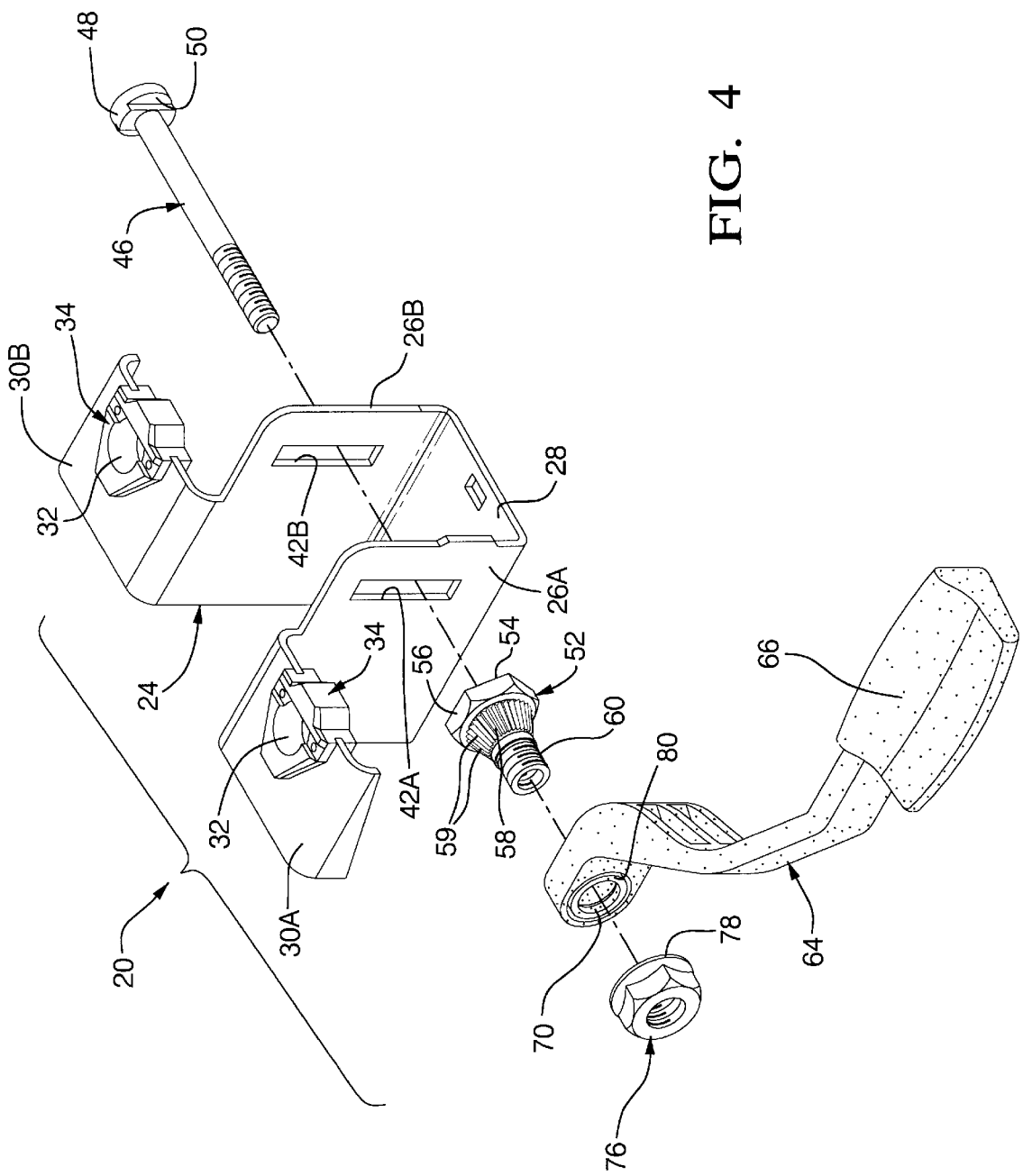
FIG. 4 is a fragmentary, exploded, perspective view of the clamp according to this invention.

As seen best in FIGS. 3–5, a primary nut 52 of the clamp 20 is screwed onto the bolt 46 on the opposite side of the stationary bracket 24 from the bolt head 48 in a counterclockwise tightening direction, FIG. 4, relative to the bolt. The primary nut 52 includes an annular flat side 54 facing the planar side 26A of the stationary bracket 24, a hexagonal shoulder 56, a frustoconical shoulder 58 having a plurality of radial serrations 59 thereon, a tubular boss 60 in the middle of the frustoconical shoulder 58, and an annular land 62 at the base of the tubular boss. When the primary nut 52 is screwed onto the bolt in the tightening direction, the annular flat side 54 advances toward the planar side 26A of the stationary bracket 24 and vice versa.

A molded plastic operating lever 64 of the clamp 20 has a finger tab 66 at a first end, a frustoconical cavity 68 at a second end, and a lateral bore 70 intersecting the middle of the frustoconical cavity. The lateral bore 70 fits over a tubular boss 60 on the primary nut 52 with the frustoconical cavity 68 facing the frustoconical shoulder 58 on the primary nut.

A secondary nut 76 of the clamp 20 is screwed onto the tubular boss 60 on the primary nut 52 in a tightening direction corresponding to the tightening direction of the primary nut on the bolt 46. The secondary nut 76 has an annular flat side 78 facing an annular flat seat 80 on the plastic operating lever. When the secondary nut 76 is rotated in its tightening direction, the annular flat side 78 bears against the annular seat 80 and thrusts the frustoconical shoulder 58 on the primary nut into the frustoconical cavity 68 in the plastic operating lever. At the same time, the radial serrations 59 in the frustoconical shoulder 58 indent corresponding radial serrations in the frustoconical cavity 68 to couple together the plastic operating lever and the primary nut for unitary rotation on the bolt 46. Importantly, the annular flat side 78 on the secondary nut 76 bears against the land 62 at the base of the tubular boss 60 on the primary nut to limit penetration of the frustoconical shoulder 58 into the frustoconical cavity 68 in the operating lever to a depth consistent with maintenance of the structural integrity of the plastic from which the operating lever 64 is molded.

A locked position of the plastic operating lever 64 which is convenient for an operator and which coincides with an optimum frictional bond between the spacer 36 on the steering column 10 and the stationary bracket 24 is established as follows. After the steering column 10 is mounted on the body of the motor vehicle for up and down pivotal movement between the planar sides 26A, 26B of the stationary bracket 24, the bolt 46 is installed through the slots 42A, 42B in the planar sides of the stationary bracket and through the apertures 44A, 44B in the planar sides 38A, 38B of the spacer until the rectangular boss 50 on the bolt head seats in the vertical slot 42B. The primary nut 52 is screwed onto the bolt and rotated in the tightening direction until the annular flat side 54 of the primary nut abuts the planar side 26A of the stationary bracket 24 and the applied torque on the primary nut attains a magnitude calculated to frictionally unite with substantial rigidity the stationary bracket and the steering column 10.

After the primary nut 52 is thus tightened, the lateral bore 70 of the plastic operating lever is fitted over the tubular boss 60 on the primary nut with the frustoconical cavity 68 facing the frustoconical shoulder 58 and with the operating lever in any convenient locked position corresponding to the adjusted position of the steering column 10 being rigidly captured. Then, the secondary nut 76 is screwed onto the tubular boss 60 of the primary nut 52 and rotated in the tightening direction until the annular flat side 78 of the secondary nut seats on the annular land 62. In that circumstance, as described above, the plastic operating lever 64 and the primary nut 52 are coupled together for unitary rotation relative to the bolt 46.

From the locked position of the plastic operating lever, clockwise pivotal movement thereof, FIG. 4, rotates the primary nut in a loosening direction on the bolt 46 opposite to the tightening direction, which rotation results in release of the frictional bond between the planar sides 26A, 26B of the stationary bracket 24 and the planar sides 38A, 38B of the spacer 36 so that the steering column 10 is pivotable up and down to a different adjusted position. Such different adjusted position is then captured by pivoting the plastic operating lever counterclockwise to its locked position to rotate the primary nut 52 in the tightening direction to reestablish the frictional bond between the planar sides of the stationary bracket and the planar sides of the spacer.

Having thus described the invention, what is claimed is:

1. A clamp for capturing the position of a motor vehicle steering column relative to a body of said motor vehicle comprising:

a stationary bracket on said body of said motor vehicle having a pair of planar sides on opposite sides of said steering column, a bolt spanning said stationary bracket having a head outboard of a first one of said pair of planar sides of said stationary bracket, means operative to rotatably immobilize said bolt relative to said stationary bracket, a primary nut screwed onto said bolt outboard of a second one of said pair of planar sides of said stationary bracket operative when rotated on said bolt in a tightening direction to cooperate with said head on said bolt in squeezing said pair of planar sides of said stationary bracket against said steering column to effect a frictional bond therebetween capturing the position of said steering column relative to said stationary bracket, a tubular boss on said primary nut, a plastic operating lever having a lateral bore therein received over said tubular boss on said primary nut, a secondary nut screwed onto said tubular boss on said primary nut outboard of said plastic operating lever operative when rotated in a tightening direction to thrust said plastic operating lever against said primary nut, means responsive to said thrust induced by said secondary nut on said plastic operating lever to couple together said plastic operating lever and said primary nut for unitary rotation relative to said bolt, means on said primary nut and on said secondary nut operative to maintain the structural integrity of said plastic operating lever by positively limiting the thrust applied by said secondary nut to said plastic operating lever, comprising: an annular land on said primary nut adjacent an inboard end of said tubular boss thereon, and an annular flat side on said secondary nut engageable on said annular land to positively obstruct rotation of said secondary nut in said tightening direction thereof relative to said primary nut.

2. The clamp recited in claim 1 wherein said means responsive to the thrust induced by said secondary nut on said plastic operating lever to couple together said plastic operating lever and said primary nut for unitary rotation relative to said bolt comprises:

a frustoconical cavity in said plastic operating lever, and a frustoconical shoulder on said primary nut at said inboard end of said tubular boss on said primary nut thrust into said frustoconical cavity in said plastic operating lever in response to rotation in said tightening direction of said secondary nut on said primary nut.

3. The clamp recited in claim 2 further comprising:

a plurality of radial serrations on said frustoconical shoulder on said primary nut operative to indent a corresponding plurality of radial serrations in said frustoconical cavity to enhance the couple between said primary nut and said plastic operating lever for unitary rotation relative to said bolt.

4. The clamp recited in claim 1 wherein said means operative to rotatably immobilize said bolt relative to said stationary bracket comprises:
- a slot in said first one of said pair of planar sides of said stationary bracket through which said bolt protrudes, and
- a rectangular land on said head of said bolt slidable in said slot in said first one of said pair of planar sides of said stationary bracket and cooperating with a plurality of edges of said slot in preventing rotation of said bolt relative to said stationary bracket.

* * * * *